US012742722B2

(12) United States Patent
Ahmed

(10) Patent No.: US 12,742,722 B2
(45) Date of Patent: Sep. 22, 2026

(54) WAFER-LEVEL BOND STRENGTH MEASUREMENT

(71) Applicant: Intel Corporation, Santa Clara, CA (US)

(72) Inventor: Khaled Ahmed, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 17/973,316

(22) Filed: Oct. 25, 2022

(65) Prior Publication Data

US 2024/0133799 A1 Apr. 25, 2024
US 2024/0230516 A9 Jul. 11, 2024

(51) Int. Cl.
*G01N 19/04* (2006.01)

(52) U.S. Cl.
CPC .................................... *G01N 19/04* (2013.01)

(58) Field of Classification Search
CPC ........... G01N 19/04; G01N 3/068; G01N 3/08
USPC .... 73/24.01, 24.04, 24.05, 32 A, 61.49, 827, 73/831, 150 A, 104, 105; 356/73, 614, 356/625, 486–489, 496–516
See application file for complete search history.

(56) References Cited

U.S. PATENT DOCUMENTS

| | | | | |
|---|---|---|---|---|
| 7,913,544 B1 * | 3/2011 | Chand | G01Q 70/16 | 216/2 |
| 2007/0062264 A1 * | 3/2007 | Wang | G01Q 70/14 | 73/105 |
| 2011/0061452 A1 * | 3/2011 | King | G01Q 60/32 | 73/105 |
| 2016/0202288 A1 * | 7/2016 | Erickson | G01Q 60/24 | 850/40 |

FOREIGN PATENT DOCUMENTS

| | | | |
|---|---|---|---|
| CN | 102788888 A * | 11/2012 | |
| CN | 105659118 A * | 6/2016 | G01B 11/306 |

* cited by examiner

*Primary Examiner* — Robert R Raevis
(74) *Attorney, Agent, or Firm* — Gray Ice Higdon, PLLC

(57) ABSTRACT

This disclosure describes systems, methods, and devices related to bond strength measurement. A device may comprise a first portion of a plate connected to a movement mechanism, a second portion of the plate comprising a sticky probe and a third portion of the plate comprising a mirror with a reflective side pointing outwards. The device may further comprise an optical fiber sensor assembly comprising an optical fiber bundle for sending light through a first optical fiber and receiving light reflected from the mirror through a second optical fiber.

20 Claims, 8 Drawing Sheets

Pressure (GPa)

0 -0.2 -0.4 -0.6 -0.8 -1 -1.2 -1.4 -1.6 -1.8 -2

-2 -1.5 -1 -0.5 0 0.5 1 1.5 2

Relative Separation

WAFER-LEVEL BOND STRENGTH MEASUREMENT

TECHNICAL FIELD

This disclosure generally relates to systems and methods for bond strength measurement and, more particularly, to wafer-level bond strength measurement.

BACKGROUND

Bond strength between two materials can be difficult to measure for relatively small bond areas. There is a need for a solution to measure bond strength on devices with micrometer size, for example, at a wafer level.

Figure 1:
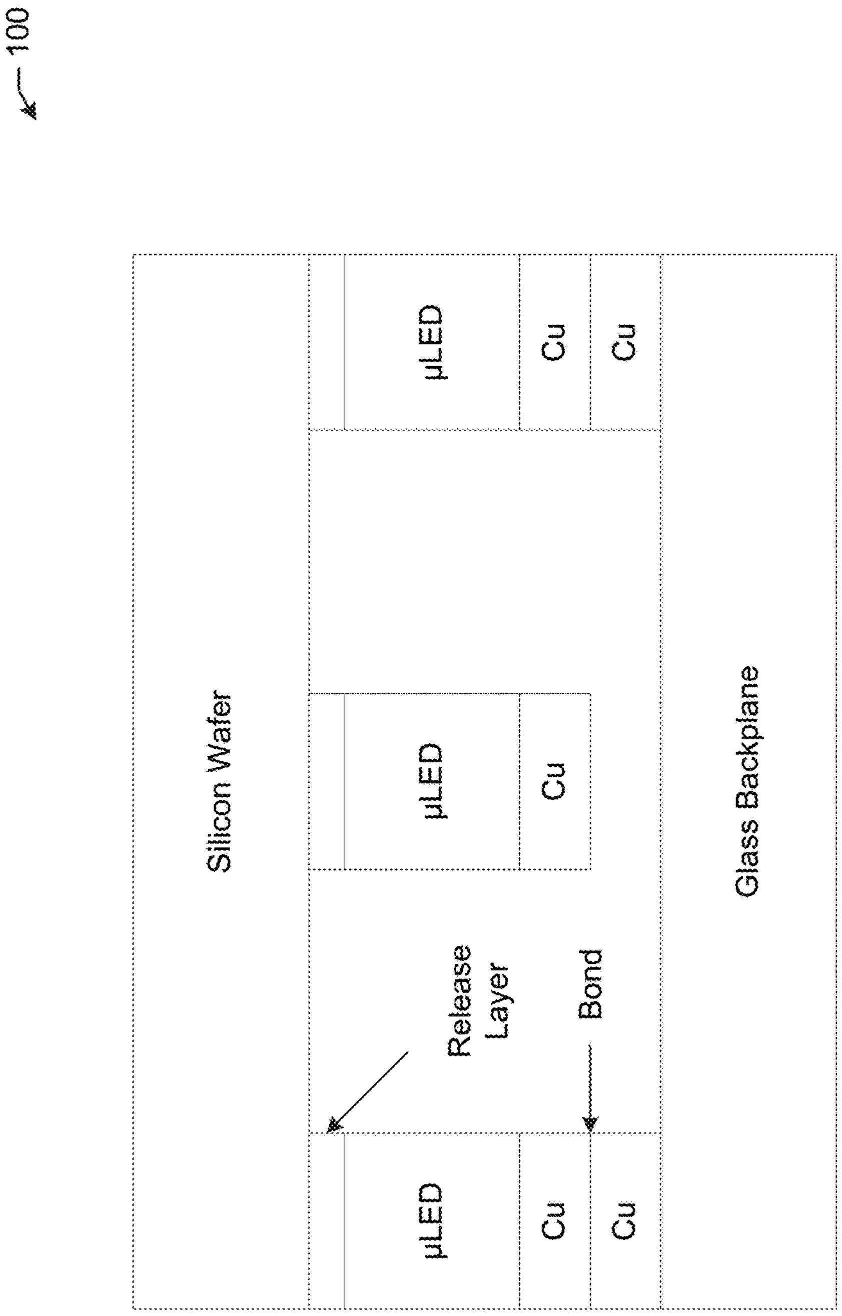
FIGS. 1-6 depict illustrative schematic diagrams for bond strength measurement, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Currently, laser-based photonics are the leading candidate technologies for long distance communication from rack to rack in data centers or from chip to chip. In this case, an external laser pumps light into a silicon photonics chip that takes the electrical signal from SOC/FPGA/GPU and produces light signals to transmit data to other chips via optical fibers. This approach brings cooling, complexity, power, and cost challenges.

Fueled by emerging bandwidth-hungry applications and the increase in computer processing power that follows Moore's law, internet traffic has sustained exponential growth in the past, and this trend is expected to continue for the foreseeable future. In the past two decades, internet traffic demand was mainly met by wavelength-division multiplexing (WDM) technology, which can increase the spectral bandwidth of an optical communication channel by 100×. Space-division multiplexing (SDM) uses a multiplicity of space channels to increase the capacity for optical communication. It is applicable for optical communication in both free space and guided waves. SDM using multicore fibers (MCFs), has attracted much attention since the year 2000 for the next multiplicative capacity growth for optical communication. The combination of WDM and SDM will help improve the bandwidth of optical communication channels by orders of magnitude.

MicroLEDs of size smaller than 50 μm promise the realization of SDM with low cost, low energy consumption, and low sensitivity to thermal effects. The challenge is transferring millions of MicroLEDs from the growth substrate to CMOS wafers at a low cost. Conventional pick and place technology is costly for populating 300 mm CMOS wafers with MicroLEDs. Reduction of this cost component by switching to truly massive transfer technology will produce significant display manufacturing cost reduction. Adopting wafer-to-wafer bonding to manufacturing μLED transfer is the closest to true massive transfer. When wafer-to-wafer bonding equipment is used, the μLEDs are selectively bonded and released to copper pads on the CMOS backplane wafer that contains CMOS driving circuitry. Selectivity is achieved by having copper pads protrude out of the backplane surface with a copper thickness of ~500 nm. Copper-to-copper direct bonding is used. First, a temporary bond is created between copper on the μLED and copper on the backplane. The μLEDs on the wafer are then selectively released by using an infrared laser beam through the backside of the silicon wafer. The backplanes, with copper-to-copper temporary bonds between the μLEDs and copper pads, are then annealed at 200° C. for 30 min to create permanent, strong bonds. The bond strength of the temporary bond needs to withstand transportation of the wafer-backplane assembly from the bonding chamber to the release chamber, and from the release chamber to the annealing chamber. The temporary bond also needs to support the separation of MicroLEDs from the silicon substrate after laser irradiation of the release layer between the MicroLED and the silicon substrate. The resistance force includes the attachment force between GaN and silicon substrate. A system, method, and apparatus to measure the copper-to-copper bond strength are necessary for this technology to become production worthy.

No solution is available to measure bond strength on devices with sizes down to approximately 5 micrometers at the wafer level.

Example embodiments of the present disclosure relate to systems, methods, and devices for wafer-level metal-to-metal bond strength measurement.

In one or more embodiments, a bond strength measurement system may comprise a wafer-level bond strength measurement apparatus suitable for bonds of two materials with micrometers dimensions. The two materials may be two dielectrics, two metals, two polymers, a metal and a dielectric, or any other combination. In this disclosure, the bond strength between two copper materials is shown as an example, but it should be understood that this is for illustration purposes and it is not meant as a limitation. The apparatus may be positioned relative to a silicon wafer that may be held with a vacuum chuck. A probe (e.g., a polydimethylsiloxane (PDMS) probe) may be brought into contact (at a contact surface) with the top surface associated with one of the metals that is bonded to another metal (e.g., two copper layers bonded together). The bond strength between the probe and the top surface may be strong enough to separate the two metals and break the bond between them. When adhesion between the probe and the top surface is established, an external force is applied to pull the first material away from the second material that were bonded together. As the force increases, the separation distance is monitored using an optical fiber sensor assembly to determine the bond strength that held the two metals together. The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 depicts an illustrative schematic diagram 100 for key blocks of the bond strength measurement apparatus, in accordance with one or more example embodiments of the present disclosure.

Referring to FIG. 1, there is shown a schematic cross section of MicroLED silicon wafer and CMOS backplane assembly showing the concept of "selective bonding" between copper pads.

In the past two decades, internet traffic demand was mainly met by wavelength-division multiplexing (WDM) technology, which can increase the spectral bandwidth of a fiber-optic communication channel by 2 orders of magnitude. Space-division multiplexing (SDM) uses multiplicity of space channels to increase capacity for optical communication. It is applicable for optical communication in both free space and guided waves. SDM using multicore fibers (MCFs), has attracted much attention since the year 2000 for the next multiplicative capacity growth for optical communication. The combination of WDM and SDM will help improve the bandwidth of optical communication channels by orders of magnitude.

Several ways have been used to measure bond strength. All of them require large samples (e.g., 20 mm×20 mm). For MicroLEDs copper-to-copper selective bonding work for Space Division Multiplexing transceivers, a method and apparatus that can measure the copper-to-copper bond strength for devices with 5 μm×5 μm, for example, is desired and it is not available on the market by any supplier. The objective is to use this critical technology that can be applicable for three-dimensional integrated circuit (3DIC) applications as well.

Figure 2:
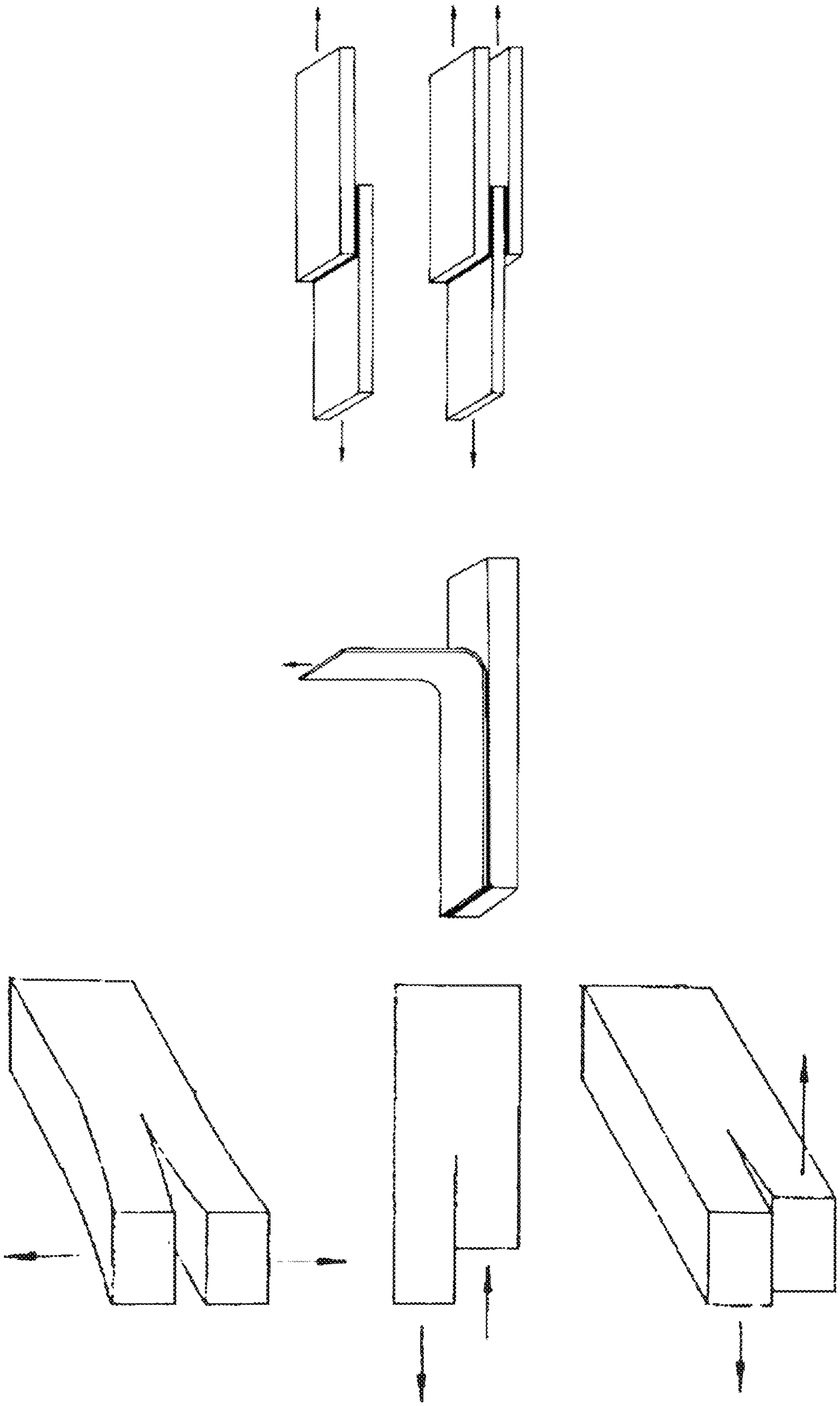

FIG. 2 depicts an illustrative schematic diagram for bond strength measurement, in accordance with one or more example embodiments of the present disclosure.

Referring to FIG. 2, there is shown several mechanisms that have been used to measure bond strength of a sample having two metals bonded together. The arrows shown in FIG. 2 show the force(s) being applied to pull bonds away between metals. All of these mechanisms require large samples (e.g., 20 mm×20 mm). Using MicroLEDs copper-to-copper selective bonding work for Space Division Multiplexing transceivers as an example throughout this disclosure, a method and apparatus that can measure the copper-to-copper bond strength for devices with 5 μm×5 μm, for example, is desired and it is not available on the market by any supplier. Although the various embodiments and examples in this disclosure are given for MicroLEDs having copper-to-copper bonds, it should be understood that these embodiments apply to measure bond strengths between materials that are bonded together and that have a small dimension where the mechanisms shown in FIG. 2 would not be practical to implement.

Figure 3:
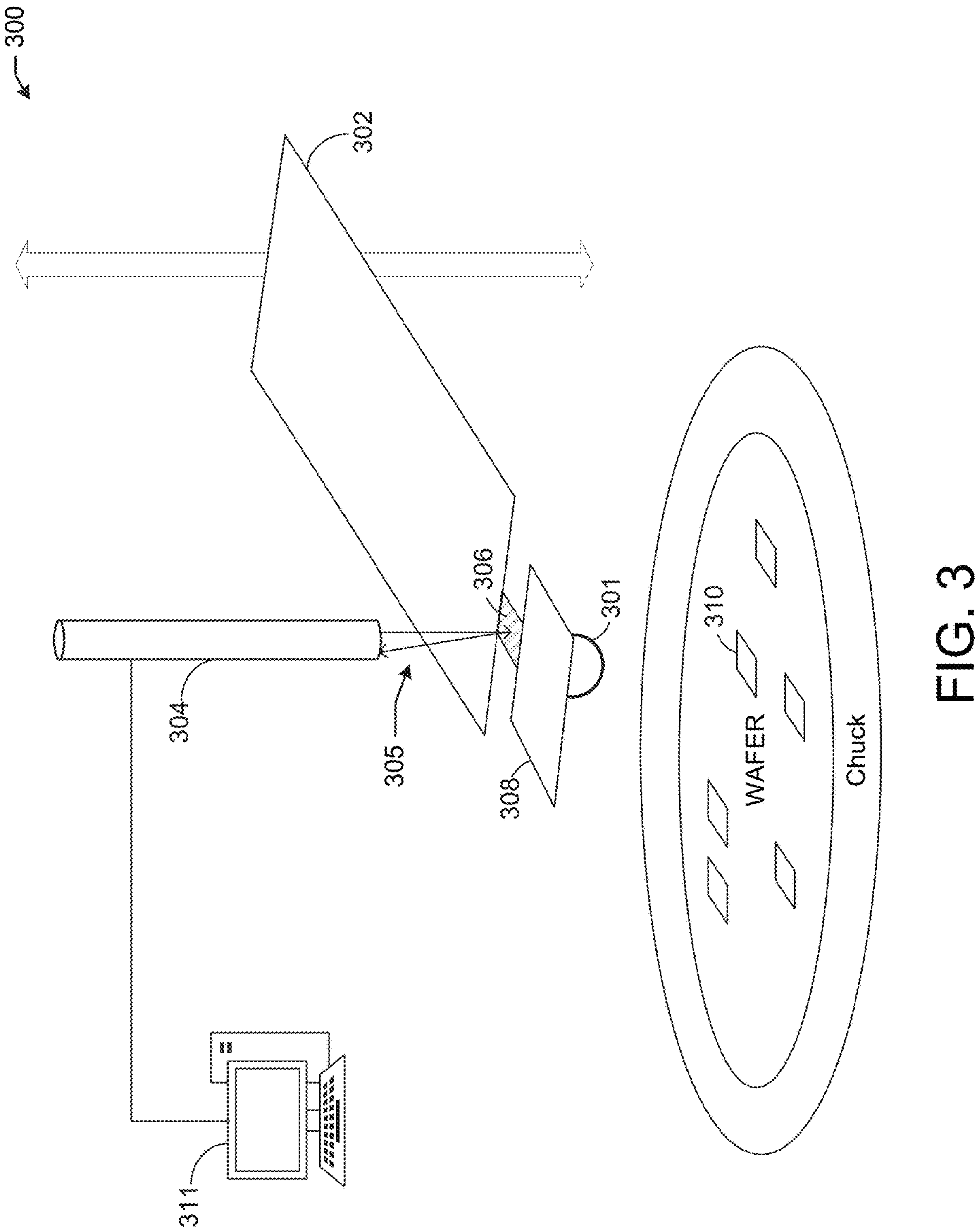

FIG. 3 depicts an illustrative schematic diagram 300 for bond strength measurement, in accordance with one or more example embodiments of the present disclosure.

Referring to FIG. 3, there is shown a wafer-level bond strength measurement apparatus suitable for bonds of devices of size down to ~5 μm×5 μm. When two metals (e.g., copper) are bonded together, they may be bonded using a direct or indirect bonding. Direct bonding is where pressure is applied between the two metals using interatomic forces to bond the two metals (e.g., copper-to-copper). Indirect bonding is when solder or other adhesive is used to interfuse the two metals together. It should be understood that the embodiments of this disclosure apply to both indirect and direct bonding of two or more metals, in this case copper-to-copper is used throughout for illustrative purposes and is not supposed to be limiting.

In FIG. 3, there is shown that the wafer-level bond strength measurement apparatus is comprised of a plate 302 that is capable of moving upward and downward. The plate 302 comprises a mirror 306 that is placed under a optical fiber bundle 304. The plate 302 may also comprise a section 308 that is configured to hold a probe (e.g., a sticky PDMS probe) 301. The shape or material of the probe may be selected based on implementation that yield desired results. For example, the probe may be round, oval, or rectangular in shape. Also, although PDMS is used as the material for the probe, it should be understood a different material may be used for the probe.

Still referring to FIG. 3, a wafer held by vacuum chuck may be used as a test wafer for measuring bond strength associated with a random distribution of sample areas 310 of the wafer. The optical fiber bundle 304 is used for sending and receiving light signals 305. A computer 311 may be connected to the apparatus using a photodetector, and analog-to-digital converter (ADC) reader, a controller, and a motor stepper controller. The computer 311 may control the motor stepper to move laterally or vertically depending on the implementation. The movement may cause translation of the plate under test.

Figure 4:
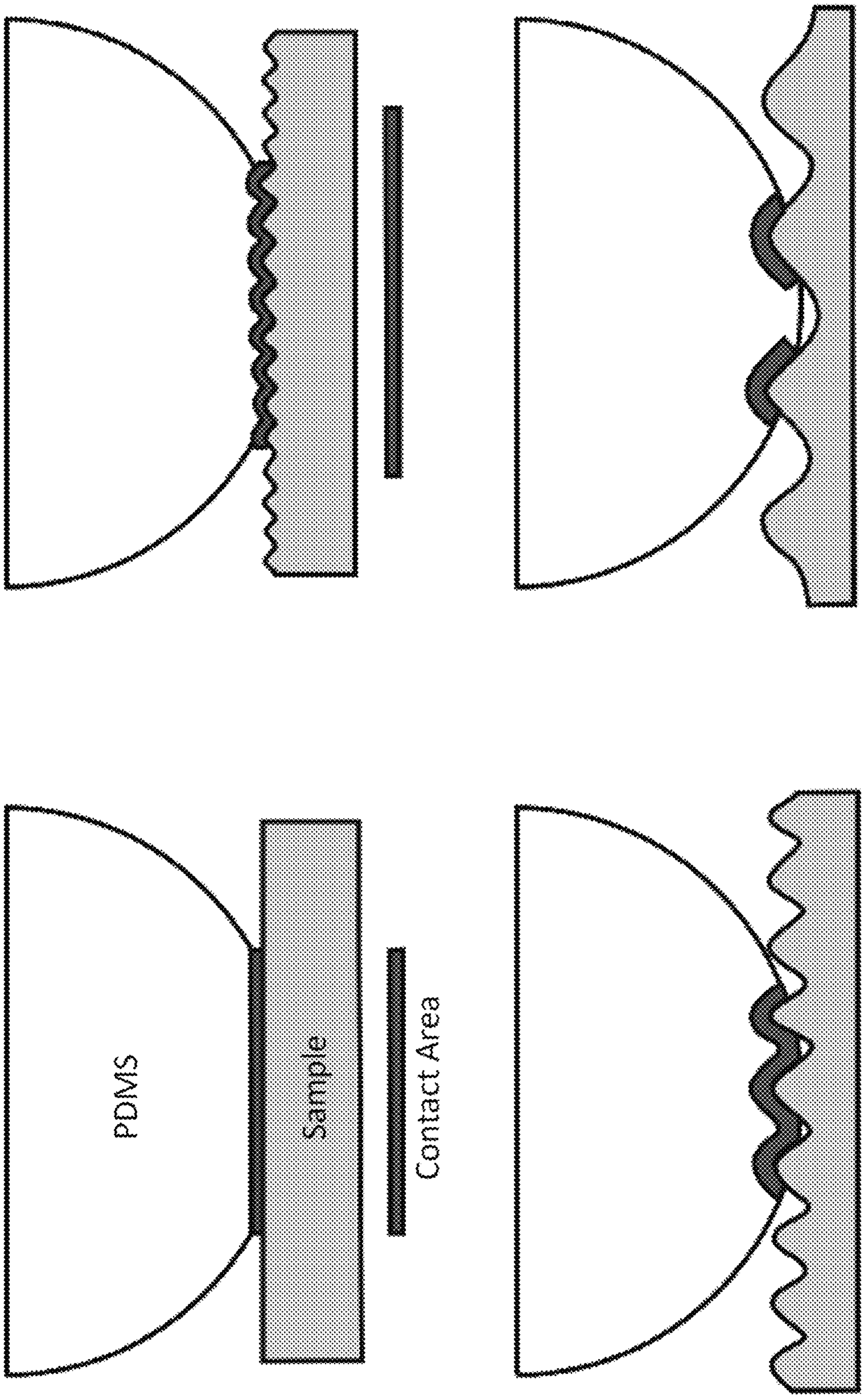
Figure 5:
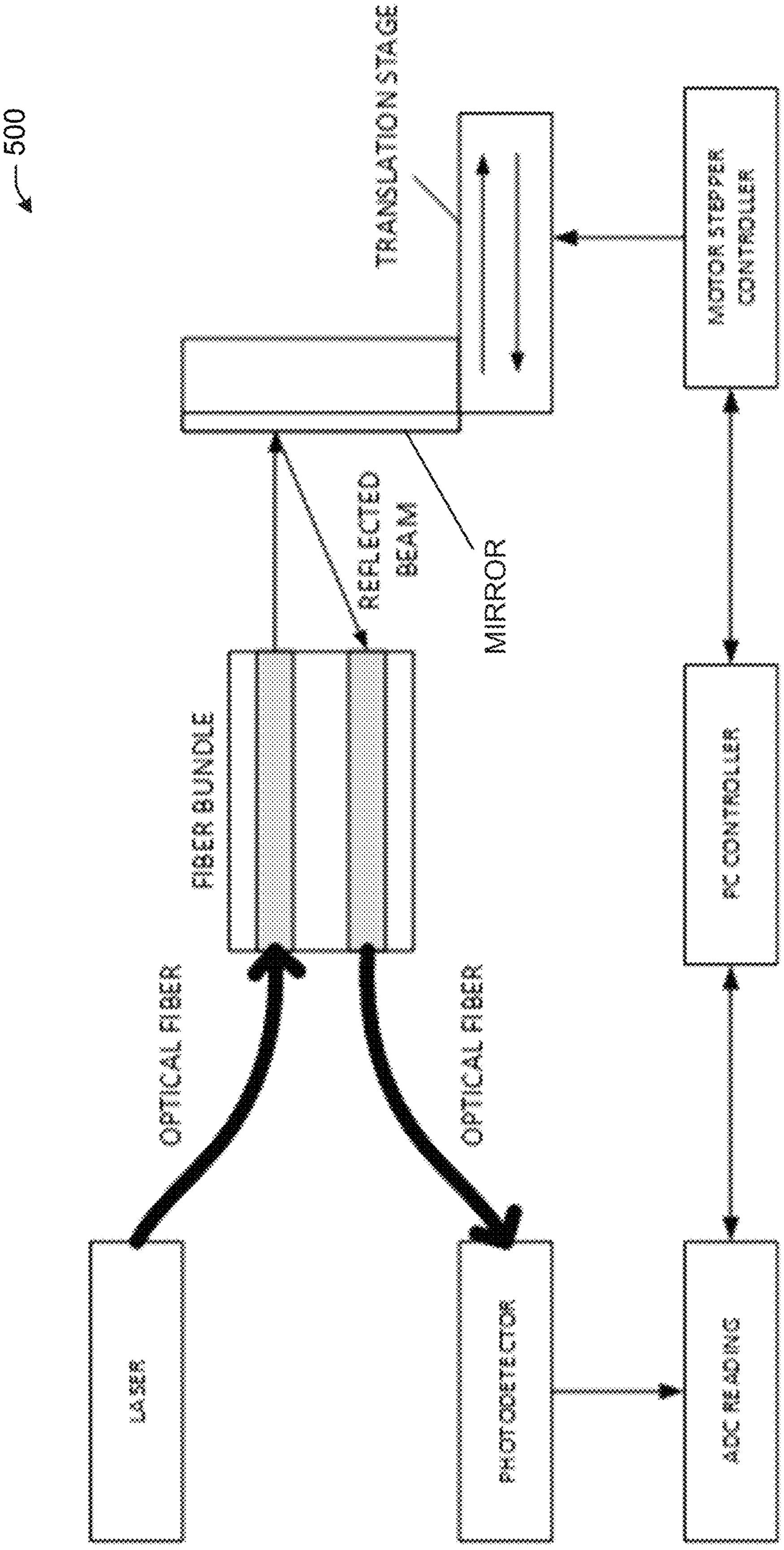
Figure 6:
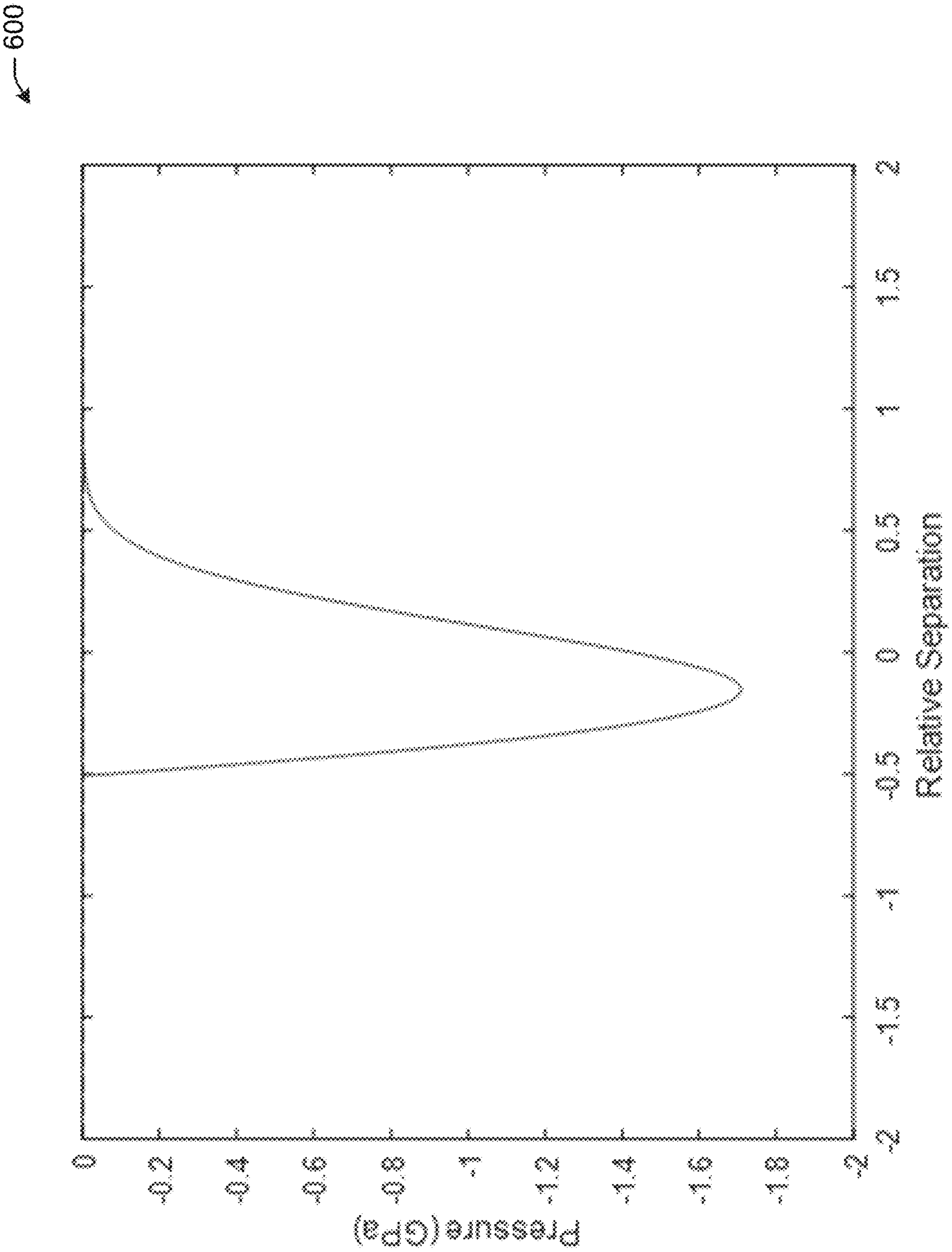

The sample in this case is a copper-to-copper bond with size ~5 μm×5 μm (could be larger or smaller). The wafer-level bond strength measurement apparatus is situated above the silicon wafer that sits on a vacuum chuck to hold the wafer in place. The probe 301 is brought into contact with the top surface of the copper (as shown in FIG. 4). The contact area depends on the surface of the top surface. The bond strength between the probe 301 and the copper upper surface (not the bond surface) should be stronger than ~1 $J/m^2$, for example. When adhesion between the probe 301 and the top surface of the copper is established, an external force is applied to the metal spring so as to pull the upper copper pad away from the lower copper pad where the bond strength measurement is desired. As the force increases, the separation distance is monitored using the optical fiber bundle 304 is a part of an optical fiber sensor assembly (composed of a mirror, optical fibers, laser, and photodetector as shown in FIG. 5). A plot of the applied external pull off force versus separation distance is created. A peak is observed (as shown in FIG. 6). The peak of the force is the desired pull off force. The separation work or bonding energy can be calculated multiplying the pull-off force by the copper-to-copper equilibrium separation (~0.25 nm).

FIG. 4 depicts an illustrative schematic diagram for bond strength measurement, in accordance with one or more example embodiments of the present disclosure.

Referring to FIG. 4, there is shown a PDMS sticky probe is brought into contact with the top surface of the copper of a wafer. The contact area determines the strength of the bond between the PDMS probe and the copper top surface. Slightly rough surface (top right corner picture) will have stronger bond than a perfectly smooth surface (top left corner case). If the top copper surface gets rougher, the contact area starts to decrease so is the bonding strength between the PDMS sticky probe and the copper (lower left and lower right cases).

FIG. 5 depicts an illustrative schematic diagram 500 for bond strength measurement, in accordance with one or more example embodiments of the present disclosure.

Referring to FIG. 5, there is shown an operation of optical fiber sensor when measuring differential position of a sample (in this example illustration it is the translation stage). A laser beam is coupled into an optical fiber bundle (or a multicore fiber). The laser beam hits a mirror surface is that fixated to a translation stage (or moving object). The reflected light is coupled into a photodetector via an optical fiber. The differential position is calculated from the speed of light times differential time between sent and received optical signals equals differential position.

FIG. 6 depicts an illustrative schematic diagram 600 for bond strength measurement apparatus, in accordance with one or more example embodiments of the present disclosure.

Referring to FIG. 6, there is shown an example illustration of the measured external force versus differential position. The peak of the curve is associated with the pull-off force (or bond strength). Normalization of the bond strength to the area of the bond gives the pressure in MPa. The pressure is multiplied by the equilibrium copper-to-copper position (~0.25 nm) to obtain the bonding energy in J/m$^2$.

It is understood that the above descriptions are for purposes of illustration and are not meant to be limiting.

Figure 7:
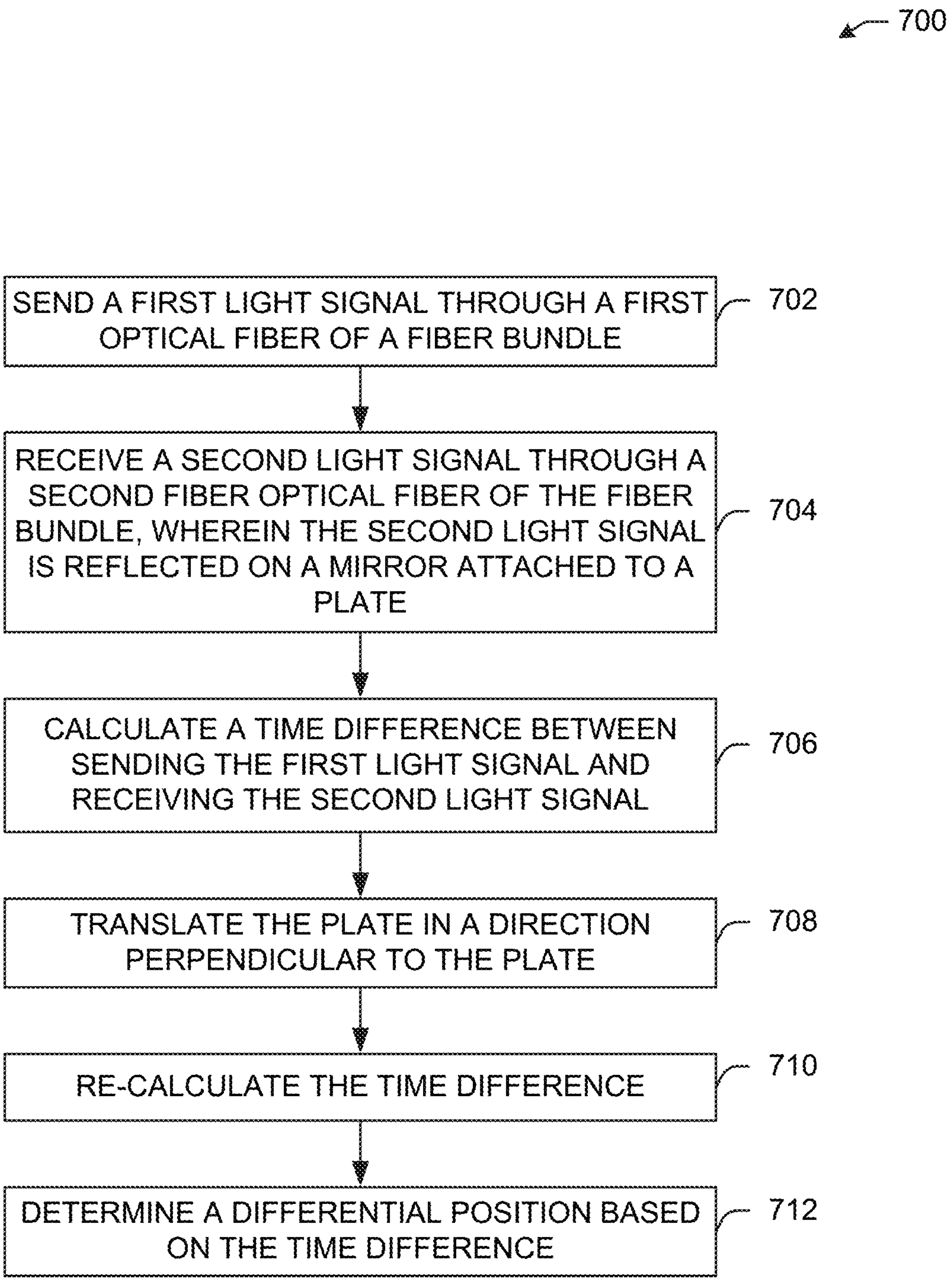
FIG. 7 illustrates a flow diagram of a process for an illustrative bond strength measurement system, in accordance with one or more example embodiments of the present disclosure.

FIG. 7 illustrates a flow diagram of a process 700 for a bond strength measurement system, in accordance with one or more example embodiments of the present disclosure.

In some embodiments, the electronic device(s), network(s), system(s), chip(s) or component(s), or portions or implementations thereof, of FIGS. 1-6, or some other figure herein, may be configured to perform one or more processes, techniques, or methods as described herein, or portions thereof. One such process is depicted in FIG. 7.

For example, the process may include, at 702, sending a first light signal through a first optical fiber of a fiber bundle.

The process further includes, at 704, receiving a second light signal through a second fiber optical fiber of the fiber bundle, wherein the second light signal is reflected on a mirror attached to a plate.

The process further includes, at 706, calculating a time difference between sending the first light signal and receiving the second light signal.

The process further includes, at 708, translating the plate in a direction perpendicular to the plate.

The process further includes, at 710, re-calculating the time difference; and The process further includes, at 712, determining a differential position based on the time difference.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is understood that the above descriptions are for purposes of illustration and are not meant to be limiting.

Figure 8:
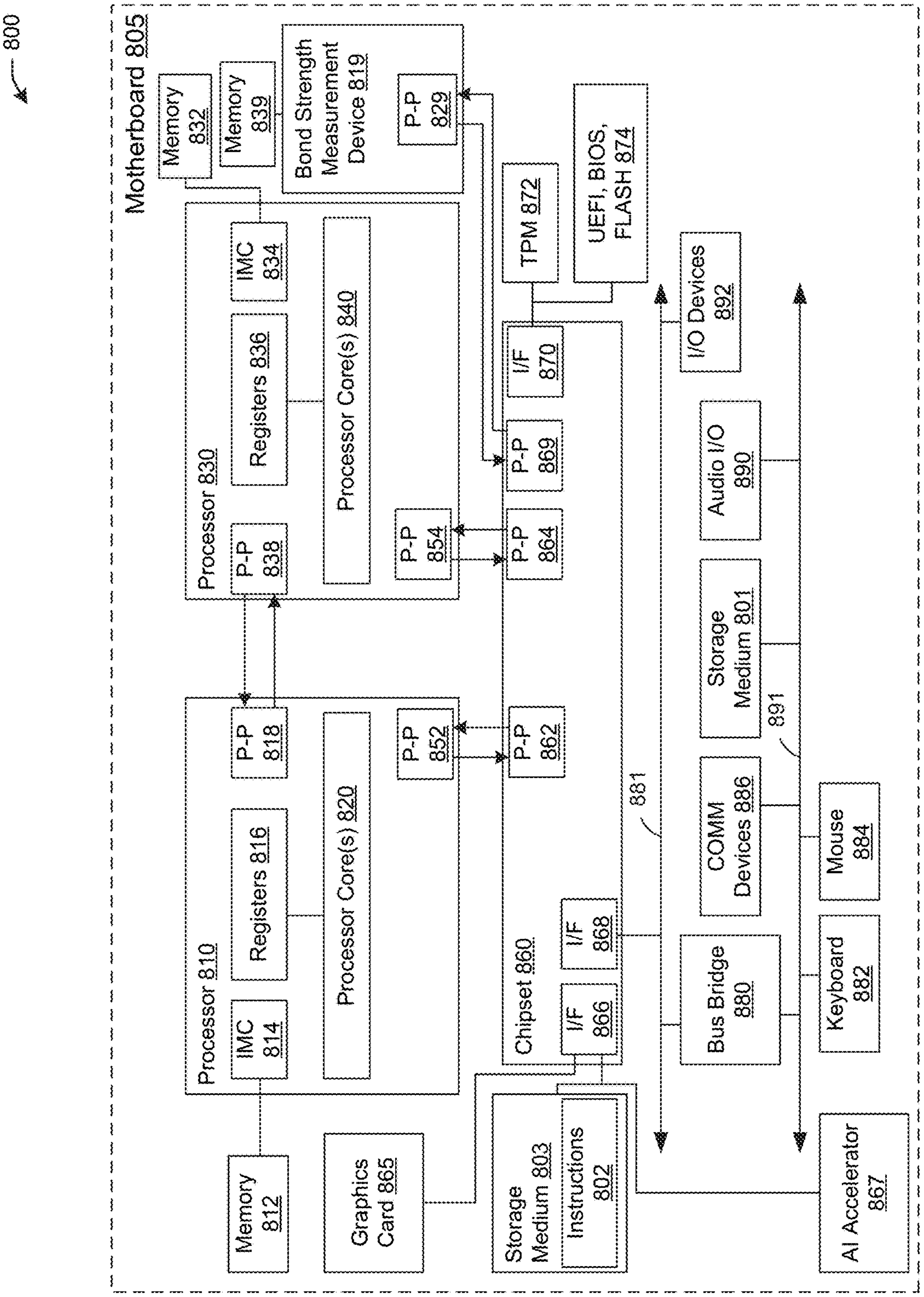
FIG. 8 is a block diagram illustrating an example of a computing device or computing system upon which any of one or more techniques (e.g., methods) may be performed, in accordance with one or more example embodiments of the present disclosure.

FIG. 8 illustrates an embodiment of an exemplary system 800, in accordance with one or more example embodiments of the present disclosure.

In various embodiments, the computing system 800 may comprise or be implemented as part of an electronic device.

In some embodiments, the computing system 800 may be representative, for example, of a computer system that implements one or more components of FIG. 1.

The embodiments are not limited in this context. More generally, the computing system 800 is configured to implement all logic, systems, processes, logic flows, methods, equations, apparatuses, and functionality described herein and with reference to FIGS. 1-6.

The system 800 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, a handheld device such as a personal digital assistant (PDA), or other devices for processing, displaying, or transmitting information. Similar embodiments may comprise, e.g., entertainment devices such as a portable music player or a portable video player, a smart phone or other cellular phones, a telephone, a digital video camera, a digital still camera, an external storage device, or the like. Further embodiments implement larger scale server configurations. In other embodiments, the system 800 may have a single processor with one core or more than one processor. Note that the term "processor" refers to a processor with a single core or a processor package with multiple processor cores.

In at least one embodiment, the computing system 800 is representative of one or more components of FIG. 1. More generally, the computing system 800 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 800. For example, a component can be, but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 800 comprises a motherboard 805 for mounting platform components. The motherboard 805 is a point-to-point interconnect platform that includes a processor 810, a processor 830 coupled via a point-to-point interconnects as an Ultra Path Interconnect (UPI), and a bond strength measurement device 819. In other embodiments, the system 800 may be of another bus architecture, such as a multi-drop bus. Furthermore, each of processors 810 and 830 may be processor packages with multiple processor cores. As an example, processors 810 and 830 are shown to include processor core(s) 820 and 840, respectively. While the system 800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 810 and the chipset 860. Some platforms may include additional components and some platforms may only include sockets to mount the processors and/or the chipset.

The processors 810 and 830 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 810, and 830.

The processor 810 includes an integrated memory controller (IMC) 814, registers 816, and point-to-point (P-P) interfaces 818 and 852. Similarly, the processor 830 includes an IMC 834, registers 836, and P-P interfaces 838 and 854. The IMC's 814 and 834 couple the processors 810 and 830, respectively, to respective memories, a memory 812 and a memory 832. The memories 812 and 832 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 812 and 832 locally attach to the respective processors 810 and 830.

In addition to the processors 810 and 830, the system 800 may include a bond strength measurement device 819. The bond strength measurement device 819 may be connected to chipset 860 by means of P-P interfaces 829 and 869. The bond strength measurement device 819 may also be connected to a memory 839. In some embodiments, the bond strength measurement device 819 may be connected to at least one of the processors 810 and 830. In other embodiments, the memories 812, 832, and 839 may couple with the processor 810 and 830, and the bond strength measurement device 819 via a bus and shared memory hub.

System 800 includes chipset 860 coupled to processors 810 and 830. Furthermore, chipset 860 can be coupled to storage medium 803, for example, via an interface (I/F) 866. The I/F 866 may be, for example, a Peripheral Component Interconnect-enhanced (PCI-e). The processors 810, 830, and the bond strength measurement device 819 may access the storage medium 803 through chipset 860.

Storage medium 803 may comprise any non-transitory computer-readable storage medium or machine-readable storage medium, such as an optical, magnetic or semiconductor storage medium. In various embodiments, storage medium 803 may comprise an article of manufacture. In some embodiments, storage medium 803 may store computer-executable instructions, such as computer-executable instructions 802 to implement one or more of processes or operations described herein, (e.g., process 700 of FIG. 7). The storage medium 803 may store computer-executable instructions for any equations depicted above. The storage medium 803 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 810 couples to a chipset 860 via P-P interfaces 852 and 862 and the processor 830 couples to a chipset 860 via P-P interfaces 854 and 864. Direct Media Interfaces (DMIs) may couple the P-P interfaces 852 and 862 and the P-P interfaces 854 and 864, respectively. The DMI may be a high-speed interconnect that facilitates, e.g., eight Giga Transfers per second (GT/s) such as DMI 3.0. In other embodiments, the processors 810 and 830 may interconnect via a bus.

The chipset 860 may comprise a controller hub such as a platform controller hub (PCH). The chipset 860 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 860 may comprise more than one controller hub such as a chipset with a memory controller hub, a graphics controller hub, and an input/output (I/O) controller hub.

In the present embodiment, the chipset 860 couples with a trusted platform module (TPM) 872 and the UEFI, BIOS, Flash component 874 via an interface (I/F) 870. The TPM 872 is a dedicated microcontroller designed to secure hardware by integrating cryptographic keys into devices. The UEFI, BIOS, Flash component 874 may provide pre-boot code.

Furthermore, chipset 860 includes the I/F 866 to couple chipset 860 with a high-performance graphics engine, graphics card 865. In other embodiments, the system 800 may include a flexible display interface (FDI) between the processors 810 and 830 and the chipset 860. The FDI interconnects a graphics processor core in a processor with the chipset 860.

Various I/O devices 892 couple to the bus 881, along with a bus bridge 880 which couples the bus 881 to a second bus 891 and an I/F 868 that connects the bus 881 with the chipset 860. In one embodiment, the second bus 891 may be a low pin count (LPC) bus. Various devices may couple to the second bus 891 including, for example, a keyboard 882, a mouse 884, communication devices 886, a storage medium 801, and an audio I/O 890.

The artificial intelligence (AI) accelerator 867 may be circuitry arranged to perform computations related to AI. The AI accelerator 867 may be connected to storage medium 803 and chipset 860. The AI accelerator 867 may deliver the processing power and energy efficiency needed to enable abundant-data computing. The AI accelerator 867 is a class of specialized hardware accelerators or computer systems designed to accelerate artificial intelligence and machine learning applications, including artificial neural networks and machine vision. The AI accelerator 867 may be applicable to algorithms for robotics, internet of things, other data-intensive and/or sensor-driven tasks.

Many of the I/O devices 892, communication devices 886, and the storage medium 801 may reside on the motherboard 805 while the keyboard 882 and the mouse 884 may be add-on peripherals. In other embodiments, some or all the I/O devices 892, communication devices 886, and the storage medium 801 are add-on peripherals and do not reside on the motherboard 805.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system. The system also includes a first portion of a plate connected to a movement mechanism; a second portion of the plate may include a probe, a third portion of the plate may include a mirror with a reflective side pointing outwards, and an optical fiber sensor assembly may include an optical fiber bundle for sending light through a first optical fiber and receiving light reflected from the mirror through a second optical fiber. Other embodiments of this aspect include corresponding computer systems, apparatus, and computer programs recorded on one or more computer storage devices, each configured to perform the actions of the methods.

Implementations may include one or more of the following features. The system where the movement mechanism causes the plate to translate in a direction that is approximately perpendicular to the plate. Translating the plate causes the probe to adhere to a top surface associated with a first material, where the first material is bonded to a second material. Adhering to the top surface is established on a contact area that is based on a shape of the top surface. A bond strength between the probe and the top surface is greater than or equal to a bond strength between the first material and the second material. After adhesion between the probe and the top surface associated with the first material is established, an external force is applied to the first portion of the plate to pull the first material away from the second material where a bond strength measurement is desired. As the external force increases, a separation distance is monitored using the optical fiber sensor assembly. The separation distance is associated with a differential position calculated based on a differential time between a sent optical signal and a received optical signal through the optical fiber bundle. The plate is a metal plate. Probe is a composed of a polydimethylsiloxane (PDMS) material. Implementations of the described techniques may include hardware, a method or process, or computer software on a computer-accessible medium.

One general aspect includes. The method also includes sending a first light signal through a first optical fiber of a fiber bundle. The method also includes receiving a second light signal through a second fiber optical fiber of the fiber bundle, where the second light signal is reflected on a mirror attached to a plate. The method also includes calculating a time difference between sending the first light signal and receiving the second light signal. The method also includes translating the plate in a direction perpendicular to the plate. The method also includes re-calculating the time difference. The method also includes determining a differential position based on the time difference. Other embodiments of this aspect include corresponding computer systems, apparatus, and computer programs recorded on one or more computer storage devices, each configured to perform the actions of the methods.

Implementations may include one or more of the following features. The method where translating the plate causes a probe to adhere to a top surface associated with a first material, where the first material is bonded to a second material. Adhering to the top surface is established on a contact area that is based on a shape of the top surface. A bond strength between the probe and the top surface is greater than or equal to a bond strength between the first material and the second material. After adhesion between the probe and the top surface associated with the first material is established, an external force is applied to a first portion of the plate to pull the first material away from the second material where a bond strength measurement is desired. As the external force increases, a separation distance is monitored using an optical fiber sensor assembly. Implementations of the described techniques may include hardware, a method or process, or computer software on a computer-accessible medium.

One general aspect includes an apparatus for bond strength measurement. The apparatus also includes a first portion of a metal plate connected to a movement mechanism. The apparatus also includes a second portion of the metal plate may include a polydimethylsiloxane (PDMS) probe to adhere to a top surface of a silicon wafer. The apparatus also includes an optical fiber sensor assembly may include a mirror, a plurality of optical fibers, a laser, and a photodetector. Other embodiments of this aspect include corresponding computer systems, apparatus, and computer programs recorded on one or more computer storage devices, each configured to perform the actions of the methods.

Implementations may include one or more of the following features. The apparatus where adhering to the top surface is established on a contact area that is based on a shape of the top surface. Translating the plate causes the PDMS probe to adhere to the top surface, where the top surface is associated with a first copper layer of the wafer bonded a second copper layer of the wafer. After adhesion between the probe and the top surface is established, an external force is applied to the first portion of the metal plate to pull the first copper layer away from the second copper layer, where a bond strength measurement is desired. Implementations of the described techniques may include hardware, a method or process, or computer software on a computer-accessible medium.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:

a first portion of a plate connected to a movement mechanism;

a second portion of the plate comprising a probe;

a third portion of the plate comprising a mirror integrated into the plate with a reflective side pointing outwards; and an optical fiber sensor assembly comprising an optical fiber bundle for sending light through a first optical fiber and receiving light reflected from the mirror through a second optical fiber, wherein the optical fiber sensor assembly is configured to calculate a differential position of the plate based on a time difference between a sent light signal and a received light signal reflected from the mirror.

2. The system of claim 1, wherein the movement mechanism causes the plate to translate in a direction that is approximately perpendicular to the plate.

3. The system of claim 2, wherein translating the plate causes the probe to adhere to a top surface associated with a first material, wherein the first material is bonded to a second material.

4. The system of claim 3, wherein adhering to the top surface is established on a contact area that is based on a shape of the top surface.

5. The system of claim 3, wherein a bond strength between the probe and the top surface is greater than or equal to a bond strength between the first material and the second material.

6. The system of claim 3, wherein after adhesion between the probe and the top surface associated with the first material is established, an external force is applied to the first portion of the plate to pull the first material away from the second material where a bond strength measurement is desired.

7. The system of claim 6, wherein as the external force increases, a separation distance is monitored using the optical fiber sensor assembly.

8. The system of claim 7, wherein the separation distance is associated with a differential position calculated based on a differential time between a sent optical signal and a received optical signal through the optical fiber bundle.

9. The system of claim 1, wherein the plate is a metal plate.

10. The system of claim 1, wherein probe is a composed of a polydimethylsiloxane (PDMS) material.

11. A method comprising:

sending a first light signal through a first optical fiber of a fiber bundle;

receiving a second light signal through a second fiber optical fiber of the fiber bundle, wherein the second light signal is reflected on a mirror that is a portion of a plate;

calculating a time difference between sending the first light signal and receiving the second light signal;

translating the plate in a direction perpendicular to the plate;

re-calculating the time difference; and determining a differential position based on the time difference.

12. The method of claim 11, wherein translating the plate causes a probe to adhere to a top surface associated with a first material, wherein the first material is bonded to a second material.

13. The method of claim 12, wherein adhering to the top surface is established on a contact area that is based on a shape of the top surface.

14. The method of claim 12, wherein a bond strength between the probe and the top surface is greater than or equal to a bond strength between the first material and the second material.

15. The method of claim 12, wherein after adhesion between the probe and the top surface associated with the first material is established, an external force is applied to a first portion of the plate to pull the first material away from the second material where a bond strength measurement is desired.

16. The method of claim 15, wherein as the external force increases, a separation distance is monitored using an optical fiber sensor assembly.

17. An apparatus for bond strength measurement, the apparatus comprising:

a first portion of a metal plate connected to a movement mechanism;

a second portion of the metal plate comprising a polydimethylsiloxane (PDMS) probe to adhere to a top surface of a silicon wafer; and an optical fiber sensor assembly comprising a mirror integrated into the metal plate, a plurality of optical fibers, a laser, and a photodetector configured to determine a differential position of the metal plate based on a time differential between a sent light signal and a received light signal.

18. The apparatus of claim 17, wherein adhering to the top surface is established on a contact area that is based on a shape of the top surface.

19. The apparatus of claim 17, wherein translating the plate causes the PDMS probe to adhere to the top surface, wherein the top surface is associated with a first copper layer of the wafer bonded a second copper layer of the wafer.

20. The apparatus of claim 19, wherein after adhesion between the probe and the top surface is established, an external force is applied to the first portion of the metal plate to pull the first copper layer away from the second copper layer, where a bond strength measurement is desired.

* * * * *